Patented Sept. 9, 1952

2,610,104

UNITED STATES PATENT OFFICE 2,610,104

PRECIPITATION OF ZIRCONIUM HYDROXIDE IN A READILY FILTERABLE FORM

Howard H. Friedel, Westlake, Ohio, assignor, by mesne assignments, to the United States of America as represented by the United States Atomic Energy Commission No Drawing. Application February 12, 1952, Serial No. 271,279

4 Claims. (Cl. 23—140)

This invention relates to a process for recovering zirconium values as a readily filterable precipitate from an aqueous solution of ammonium zirconium fluoride and more particularly to a process for obtaining a readily filterable zirconium hydroxide when ammonium hydroxide is reacted with a solution of ammonium zirconium fluoride.

When an aqueous solution of ammonium zirconium fluoride is reacted with ammonium hydroxide, the reaction proceeds in accordance with the following equation:

$$(NH_4)_2ZrF_6 + 4NH_4OH = 6NH_4F + Zr(OH)_4$$

The zirconium hydroxide thus produced precipitates as a voluminous and gelatinous floc which is hard to filter and wash. If other elements such as iron, titanium, aluminum, chromium, nickel and magnesium are present in the solution of ammonium zirconium fluoride, they will precipitate from the solution with the zirconium hydroxide. It is, therefore, difficult to economically recover zirconium values from an aqueous solution of ammonium zirconium fluoride by the addition of reagents, such as ammonium hydroxide, which cause the precipitation of zirconium hydroxide.

This invention has as an object the provision of a process for obtaining a readily filterable precipitate of zirconium hydroxide from an aqueous solution of ammonium zirconium fluoride. A further object is to provide a precipitation process for zirconium hydroxide which will substantially prevent any iron or aluminum that may have contaminated the ammonium zirconium fluoride from coprecipitating with the zirconium hydroxide. A still further object is to provide a process for precipitating zirconium hydroxide in a purified and readily filterable form from an aqueous solution of crude ammonium zirconium fluoride that is contaminated with iron and aluminum. Other objects will appear hereinafter.

These objects are accomplished by the following invention in accordance with which a readily filterable non-gelatinous precipitate of zirconium values is produced from an aqueous solution of ammonium zirconium fluoride by adding thereto an aqueous solution of ammonium hydroxide which contains added salicylate ions and then recovering the precipitated zirconium values thereby obtained.

The invention is illustrated but not limited in the following examples.

Example 1

An impure batch of ammonium zirconium fluoride—$(NH_4)_2ZrF_6$—which had been obtained by roasting baddeleyite ore with ammonium bifluoride and leaching it with hydrofluoric acid was used in the experiment described in this example. This impure ammonium zirconium fluoride analyzed 15.2% in $NH_3$, 32.2% in Zr, and with respect to its zirconium content it contained 1.46% of hafnium, 0.5% of calcium, 3% of iron, 3% of aluminum, and minor amounts (0.05% or less) of other elements such as cobalt, nickel, chromium, silver, zinc, titanium, tin, lithium, vanadium, molybdenum, bismuth, lead, manganese and magnesium. 100 grams of the impure ammonium zirconium fluoride having the assay set forth in the preceding sentence was dissolved in water. A solution obtained by adding 16 grams of salicylic acid to 120 milliliters (20% excess) of concentrated (28%) C. P. ammonium hydroxide was added to the solution of ammonium zirconium fluoride. A dense, flocculent white precipitate that filtered and washed very readily was formed. The filter cake was washed with water, dried and weighed. Seventy-five grams of dried precipitate were thus recovered. This precipitate was divided into two portions, one weighing 25 grams and the other weighing 50 grams. The 50 gram portion was slurried with isopropyl alcohol to remove salicylates, filtered, dried and weighed, and 47 grams were thus recovered. The 25 gram portion assayed 42.8% in Zr before ignition, lost 53.8% of its weight on ignition to constant weight at 1100° C., and assayed 73.1% in Zr after ignition. The 47 gram portion which had been treated with isopropyl alcohol assayed 45.7% in Zr before ignition, lost 39.6% of its weight on ignition at 1100° C., and assayed 73.2% in Zr after ignition. The calcium contents of the two portions of the precipitate calculated with respect to their respective zirconium contents were both 0.3% compared with 0.5% in the ammonium zirconium fluoride used as a starting material. Whereas the iron content of the starting material calculated with respect to its zirconium content was 3%, the iron content of the ignited 25 gram portion of the precipitate dropped to 0.03% with respect to its zirconium content, and the iron content of the ignited 47 gram portion of the precipitate dropped to 0.01% with respect to its zirconium content. Furthermore, while the aluminum content of the starting material calculated with respect to its zirconium content was 3%, the aluminum content of the ignited 25 gram portion of the precipitate dropped to 0.05% with respect to its zirconium content, and the aluminum content of the ignited 47 gram portion of the precipitate dropped to 0.03% with respect to its zirconium content. It may, therefore, be appreciated that the precipitation process herein described effected considerable purification of the zirconium containing raw material with respect to the iron, aluminum and calcium impurities which accompanied it. It has been found that this precipitation process also materially reduced the small amounts of lithium, nickel, chromium, molybdenum, manganese and magnesium with which the raw material had been contaminated. Of the zirconium present in the starting material 99.4% was recovered in the precipitate.

*Example 2*

980 pounds of dry crude ammonium zirconium fluoride which assayed 29.8% in Zr was dissolved in about 2,800 liters of water. To make the solution used for the precipitation, 250 pounds of salicylic acid was dissolved in 1925 pounds of 28% C. P. ammonium hydroxide. The zirconium salt solution was heated and passed into the tank where the salicylic acid had been dissolved in the ammonium hydroxide. Heating of the zirconium solution improved the quality of the precipitate somewhat. The solution was allowed to settle for 8 hours, after which the clear supernatant liquor which contained only 0.0115 gram of zirconium per liter was decanted, and the slurry filtered.

In this run salicylic acid was used in the ratio of 0.8 pound of acid to 3 pounds of crude ammonium zirconium fluoride having a content of 1 pound of zirconium. An efficiency of 93% recovery of readily filterable zirconium hydroxide was attained in this precipitation. The zirconium hydroxide thus prepared was readily roasted to zirconium oxide at 800-1000° C.

The ammonium hydroxide containing added salicylate ions was generally added to the ammonium zirconium fluoride solution until a pH of 9 was attained. This generally entailed the use of about a 20% excess of ammonium hydroxide as in Example 1, and resulted in a substantially complete precipitation of zirconium hydroxide.

Salicylate ions may conveniently be added to the ammonium hydroxide solution used for precipitation by dissolving small amounts of salicylic acid in the ammonium hydroxide or by the addition of soluble salicylates thereto. Enough salicylic acid is added to the ammonium hydroxide, theoretically, to react with from 1% to 2% of the zirconium present in the ammonium zirconium fluoride, or that considered necessary to react with a small quantity of the zirconium and all of the impurities associated with it. The relatively small amounts of salicylic acid used in the precipitation process of the present invention make this process economically feasible for use in the production of zirconium oxide. Enough salicylic acid is used to tie up the iron, nickel, chromium, aluminum and magnesium present as soluble compounds. In addition, enough excess of salicylic acid is added to form a small percentage (1 to 2%) of zirconium salicylate. This zirconium salicylate appears as an adsorption layer on the precipitated zirconium hydroxide and thereby prevents agglomeration of the hydroxide particles. The result is a precipitate in the form of a fine sand which is readily filterable in contrast to zirconium hydroxide without this salicylate adsorption layer. Since enough salicylic acid must be used to tie up iron, aluminum and other impurities in a soluble form as well as to form some zirconium salicylate, it is obvious that the greater the amount of impurities that are associated with the ammonium zirconium fluoride, the greater the amount of salicylic acid that will have to be added to the ammonium hydroxide solution used in its precipitation. To obtain a good precipitate from solutions of the impure batches of ammonium zirconium fluoride described in the above examples, it has been found that an effective precipitating solution may be prepared by dissolving from ½ to 2 pounds of salicylic acid in the ammonium hydroxide for each pound of zirconium contained in the ammonium zirconium fluoride from which zirconium hydroxide is to be precipitated.

The zirconium hydroxide precipitate formed in accordance with the present invention after being dried is a very fluffy, highly reactive compound which can readily be converted to zirconium oxide by roasting at temperatures greater than 300° C. The precipitate may be roasted to the oxide at 800-1000° C. At lower temperatures brown and yellow streaks, probably caused by insufficient removal of the carbonized salicylate, are apparent. The zirconium oxide produced in accordance with the present invention is very reactive and may be readily chlorinated to produce zirconium tetrachloride of high purity.

The precipitation process of the present invention may also be employed in obtaining good filterable precipitates of zirconium hydroxide from aqueous solutions of the chloride, bromide, sulfate, nitrate and other water soluble salts of zirconium.

The precipitation process of the present invention has several advantages over the method of precipitating zirconium hydroxide by the addition of just ammonium hydroxide by itself to an aqueous solution of ammonium zirconium fluoride. The precipitate is not gelatinous and may be readily filtered on a vacuum filter. Furthermore, most of the iron, aluminum and other impurities which may be associated with the crude ammonium zirconium fluoride used as a starting material do not coprecipitate with the zirconium hydroxide but remain in the mother liquor. Whereas the iron and aluminum contained in the crude ammonium zirconium fluoride used in the above examples each run about 3% based upon the zirconium content of said crude salt, it was found that the zirconium hydroxide precipitates prepared in accordance with the present invention contained as little as 100 to 300 parts per million of iron and of aluminum. The precipitation process using ammonium hydroxide containing salicylate ions effected a 100-fold purification of the zirconium from iron and aluminum impurities, reducing both from about 3% to approximately 0.03%, and this constitutes a unique and advantageous attribute of the present invention.

Resort may be had to such modifications and variations as fall within the spirit of the invention and the scope of the appended claims.

I claim:

1. A process of obtaining a readily filterable nongelatinous precipitate of zirconium values from an aqueous solution of ammonium zirconium fluoride which comprises adding to said solution an aqueous solution of ammonium hydroxide which contains added salicylate ions, and recovering the precipitated zirconium values thereby obtained.

2. A process as recited in claim 1 in which the precipitated zirconium values are roasted at above 300° C. to convert said zirconium values to zirconium oxide.

3. In a method for obtaining a readily filterable zirconium containing precipitate by reaction of ammonium hydroxide with an aqueous solution of ammonium zirconium fluoride, the improvement which comprises adding salicylate ions to the ammonium hydroxide used in said reaction to improve the filtering quality of the zirconium containing precipitate thus obtained.

4. A process for obtaining zirconium oxide from ammonium zirconium fluoride which comprises dissolving ammonium zirconium fluoride in water, adding to said solution an aqueous solution of ammonium hydroxide which contains added salicylate ions, separating the precipitate of zirconium values thereby formed, slurrying said precipitate in isopropyl alcohol to remove salicylates, drying said precipitate, and then roasting said dried precipitate at above 300° C. to form zirconium oxide.

HOWARD H. FRIEDEL.

No references cited.